United States Patent
Meeker et al.

(10) Patent No.: US 10,929,033 B2
(45) Date of Patent: Feb. 23, 2021

(54) ALLOCATING VARIABLE MEDIA TYPES OF MEMORY DEVICES IN A MEMORY SYSTEM

(71) Applicant: Micron Technology, Inc., Boise, ID (US)

(72) Inventors: James H. Meeker, Liberty Hill, TX (US); Michael B. Danielson, Georgetown, TX (US); Paul A. Suhler, Austin, TX (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 15/963,007

(22) Filed: Apr. 25, 2018

(65) Prior Publication Data

US 2019/0332290 A1 Oct. 31, 2019

(51) Int. Cl.
*G06F 3/06* (2006.01)

(52) U.S. Cl.
CPC .......... *G06F 3/0631* (2013.01); *G06F 3/0604* (2013.01); *G06F 3/0634* (2013.01); *G06F 3/0685* (2013.01)

(58) Field of Classification Search
CPC .... G06F 3/0604; G06F 3/0631; G06F 3/0634; G06F 3/0685
USPC ......................................... 711/103, 170, 173
See application file for complete search history.

(56) References Cited

U.S. PATENT DOCUMENTS

| | | | | |
|---|---|---|---|---|
| 6,625,699 B2* | 9/2003 | Cohen | ................. | G06F 13/1663 711/150 |
| 2006/0069886 A1 | 3/2006 | Tulyani | | |
| 2008/0082766 A1 | 4/2008 | Okin et al. | | |
| 2011/0264845 A1 | 10/2011 | Choi | | |
| 2013/0039129 A1* | 2/2013 | Radke | ................. | G11C 11/5628 365/185.09 |
| 2013/0227203 A1* | 8/2013 | Marotta | .............. | G06F 12/0246 711/103 |
| 2014/0133226 A1* | 5/2014 | Marotta | .............. | G06F 12/0246 365/185.03 |
| 2014/0136783 A1 | 5/2014 | Kumar et al. | | |
| 2017/0031821 A1* | 2/2017 | Ramanujan | ......... | G06F 12/0638 |
| 2017/0132073 A1* | 5/2017 | Radke | ................. | G11C 11/5628 |
| 2018/0225056 A1* | 8/2018 | Roohparvar | .......... | G06F 3/0634 |
| 2019/0050162 A1* | 2/2019 | Roohparvar | .......... | G06F 3/0634 |

OTHER PUBLICATIONS

International Search Report and Written Opinion of the International Searching Authority, International Application No. PCT/US2019/028792, dated Sep. 16, 2019, 13 pages.

* cited by examiner

*Primary Examiner* — Than Nguyen
(74) *Attorney, Agent, or Firm* — Lowenstein Sandler LLP

(57) ABSTRACT

A method includes receiving an indication of an operational mode for a memory system including a set of memory devices. A first memory device of the set of memory devices includes a first media having a first media type and a second memory device of the et of memory devices includes a second media having a second media type that is different than the first media type. The method also includes allocating, by a processing device, a first portion and a second portion of the first memory device based on the operational mode for the memory system. The method also includes storing data at the first portion of the first memory device, the second portion of the first memory device, or the second memory device based on the operational mode for the memory system.

18 Claims, 6 Drawing Sheets

ALLOCATING VARIABLE MEDIA TYPES OF MEMORY DEVICES IN A MEMORY SYSTEM

TECHNICAL FIELD

The present disclosure generally relates to a memory system, and more specifically, relates to allocating variable media types of memory devices in a memory system.

BACKGROUND

A memory system can be a storage system, such as a solid-state drive (SSD), and can include one or more memory devices that store data. A memory system can include memory devices such as non-volatile memory devices and volatile memory devices. In general, a host system can utilize a memory system to store data at the memory devices of the memory system and to retrieve data from the memory devices of the memory system.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
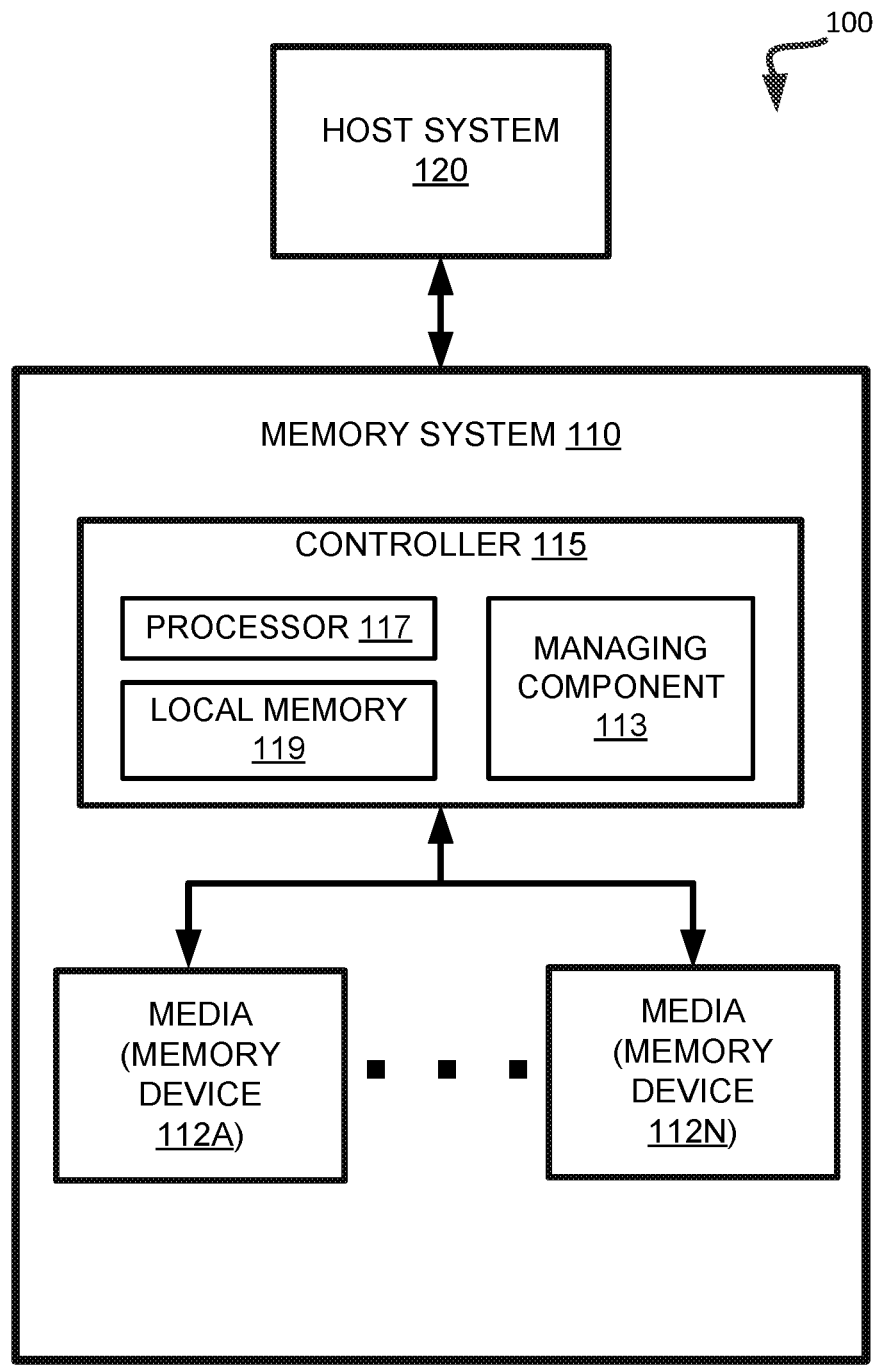
FIG. 1 illustrates an example computing environment that includes a memory system in accordance with some embodiments of the present disclosure.

A host system can utilize a memory system that includes one or more memory devices. The host system can provide write requests to store data at the memory system and can provide read requests to retrieve the data at the memory system. Conventionally, the memory devices in the memory system can include a media having a particular media type. For example, the memory devices of one memory system can include a media having a non-flash based media type (e.g., cross point array media type) and the memory devices of another memory system can include a media having a flash memory media type. The memory devices that are included in a memory system can be selected based on the goals (e.g., performance, capacity, etc.) of the memory system and the characteristics of the memory devices that are suited for achieving those goals.

In a conventional memory system, users desiring to utilize multiple memory systems having different memory devices with different media types can be limited by the number of available physical connections in the host system. Typically, each memory system has a media type that is the same for each of its memory devices and a fixed amount of its respective media type that necessitates having its own connection slot. Also, the separate media type for each memory system precludes using the memory system to store data in different operational modes. An operational mode can refer to an indication as to how the host system intends to use and store data at the memory system. For example, a conventional memory system can operate in a fixed mode by providing a function using either storage or memory semantics based on the media type of the memory devices of the memory system. A storage semantic may refer to using storage commands to perform block operations such as reading or writing some number of logical blocks to access the memory device. A memory semantic may refer to process logic that uses memory mapped input/output (IO) to access the memory device. In addition, since the amount of the media type is fixed for a dedicated operational mode in each memory system, variable amounts of the media type of each respective memory device cannot be used in the memory system for different operational modes.

Aspects of the present disclosure address the above and other deficiencies by providing a memory system including multiple memory devices having media with differing media types that can be configured to store data in different operational modes. The memory system including the memory devices having different media types can occupy a single physical connection slot in a host system. In an example, the memory system can use default settings to allocate amounts of the memory devices to store data in the different operational modes. In another example, the memory system can be configured by a user to allocate variable (e.g., non-fixed) amounts of the memory devices to store data in the different operational modes.

The memory system can include a first memory device having a first media with a first media type and a second memory device having a second media with a second media type. The first media type and the second media type may include different characteristics that are beneficial for different operational modes. For example, the first media type can provide high read/write performance while the second media type can provide high capacity storage. Additionally, a first portion and a second portion of the first memory device can be allocated by the memory system. The second portion of the first memory device can be used as a cache for the second memory device. A size allocated for the first portion and a size allocated for the second portion can vary based on the operational mode selected for the memory system. The sizes of the portions of the first memory device can have default sizes for each of the operational modes. Also, the sizes of the portions of the first memory device can be configured by a user throughout the lifetime of the memory system. The memory system can include any suitable number of operational modes (e.g., 2, 3, 4, 5+, etc.).

In some embodiments, the operational modes can include a memory expansion mode, a storage mode, a memory mode, and/or a multi-storage mode. The memory system can support numerous features, such as storage access semantics, storage region allocation, memory access semantics, cache configuration, multiple performance modes, and/or compression modes, depending on the operational mode selected.

In the memory expansion mode, the first memory device can be used for a memory type function and the second memory device can be used for a storage type function. The size of the first and second portions of the first memory device can be configured and managed to provide additional memory to the host system as desired (e.g., to run a virtual machine, to process a large amount of data, etc.). Accordingly, the memory expansion mode provides both memory and storage type functions in a single memory system where the memory device used for the memory type function is configurable and manageable by the user.

In the storage mode, the first memory device can be used for a storage type function and the second memory device can also be used for a storage type function. The first memory device can function as a first memory system providing high performance, and the second memory device can function as a second memory system providing high capacity and having a lower cost than the first memory device. There can be separate namespaces used to access the memory addresses in the first memory device and the second memory device. The storage mode can provide an administrator with the flexibility in deploying a high performance cache tier (e.g., the first memory device) along with a capacity memory system (e.g., the second memory device) within one server bay. In conventional setups, a user would have to use two slots in the server in order to support two separate memory systems that function similarly to as described above.

In the memory mode, the first memory device can be used for a memory type function and the second memory device can be used for a storage type function. The first memory device can operate as a high performance area where data is initially written. Data can be moved from the first memory device to the second memory device, as described further below. A single namespace can be used for addressing memory in the second memory device performing the storage type function. In this mode, the second memory device can be used to provide high capacity storage while the first memory device can be used to provide high performance.

In the multi-storage mode, the user can configure how many portions of the memory devices to allocate and the size of those respective portions. Further, the user can configure whether the memory devices and/or the portion(s) of the memory devices are to perform caching, a memory type function, and/or a storage type function. Also, the user can configure under which circumstances the multi-storage mode is to be selected.

In addition, the memory system can be configured to control automated data migration by moving data from one media type to another media type based on criteria, such as a user defined criteria, an access pattern detected by a processing device, or an operational mode selected for the memory system. For example, a user can configure the memory system to retain certain data on certain media types and to automatically migrate certain data between memory devices having different media types based on the criteria. The criteria can include when the data was last accessed, how many times the data was accessed, how recently the data was written to a particular memory device, and so forth.

Advantages of the present disclosure include, but are not limited to, deployment flexibility including a reduction of memory systems or connection slots required per server (i.e., host system) for expansion or operations by providing a high performance memory tier, a high capacity storage tier, and/or memory expansion capabilities in the same memory system occupying a single server slot. Additional benefits can include providing storage with high performance write characteristics and with read characteristics based on efficiency of available media types. Further, managing the placement of data between the memory devices with different media types can enhance access to the user data and overall system cost. The ability to address and manage high performance and high capacity tiers of the memory system across multiple regions can allow for the interoperation with scale out infrastructure applications in an efficient manner, thereby reducing the number of memory systems, size, and/or cost of data centers.

FIG. 1 illustrates an example computing environment 100 that includes a memory system 110 in accordance with some implementations of the present disclosure. The memory system 110 can include media, such as memory devices 112A to 112N. The memory devices 112A to 112N can be volatile memory devices, non-volatile memory devices, or a combination of such. In some embodiments, the memory system is a storage system. An example of a storage system is a solid-state drive (SSD). In general, the computing environment 100 can include a host system 120 that uses the memory system 110. In some implementations, the host system 120 can write data to the memory system 110 and read data from the memory system 110. In some embodiments, the memory system 110 is a hybrid memory/storage system.

The host system 120 can be a computing device such as a desktop computer, laptop computer, network server, mobile device, or such computing device that includes a memory and a processing device. The host system 120 can include or be coupled to the memory system 110 so that the host system 120 can read data from or write data to the memory system 110. The host system 120 can be coupled to the memory system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory system 110. The host system 120 can further utilize an NVM Express (NVMe) interface to access the memory devices 112A to 112N when the memory system 110 is coupled with the host system 120 by the PCIe interface. The physical host interface can provide an interface for passing control, address, data, and other signals between the memory system 110 and the host system 120.

The memory devices 112A to 112N can include any combination of the different types of non-volatile memory devices and/or volatile memory devices. An example of non-volatile memory devices includes a negative-and (NAND) type flash memory. Each of the memory devices 112A to 112N can include one or more arrays of memory cells such as single level cells (SLCs) or multi-level cells (MLCs) (e.g., triple level cells (TLCs) or quad-level cells (QLCs)). In some implementations, a particular memory device can include both an SLC portion and a MLC portion of memory cells. Each of the memory cells can store bits of data (e.g., data blocks) used by the host system 120. Although non-volatile memory devices such as NAND type flash memory are described, the memory devices 112A to 112N can be based on any other type of memory such as a volatile memory. In some implementations, the memory devices 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross point non-volatile memory can perform a write in-place operation, where a non-volatile memory cell can be programmed without the non-volatile memory cell being previously erased. Furthermore, the memory cells of the memory devices 112A to 112N can be grouped as memory pages or data blocks that can refer to a unit of the memory device used to store data.

The controller 115 can communicate with the memory devices 112A to 112N to perform operations such as reading data, writing data, or erasing data at the memory devices 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory system 110, including handling communications between the memory system 110 and the host system 120. In some embodiments, the local memory 119 can include memory registers storing memory pointers, fetched data, etc. The local memory 119 can also include read-only memory (ROM) for storing micro-code. While the example memory system 110 in FIG. 1 has been illustrated as including the controller 115, in another embodiment of the present disclosure, a memory system 110 may not include a controller 115, and may instead rely upon external control (e.g., provided by an external host, or by a processor or controller separate from the memory system).

In general, the controller 115 can receive commands or operations from the host system 120 and can convert the commands or operations into instructions or appropriate commands to achieve the desired access to the memory devices 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 115 can further include host interface circuitry to communicate with the host system 120 via the physical host interface. The host interface circuitry can convert the commands received from the host system into command instructions to access the memory devices 112A to 112N as well as convert responses associated with the memory devices 112A to 112N into information for the host system 120.

The memory system 110 can include a managing component 113 (e.g., circuitry, dedicated logic, programmable logic, firmware, etc.) to perform the operations described herein. In some implementations, the managing component 113 can receive an indication of an operational mode for the memory system 110 and allocate various portions of one or more memory device 112A-112N based on the operational mode for the memory system. The allocated sizes of the portions can be preset and/or configured by the user. The managing component 113 can also control migration of data between memory devices 112A-112N that have differing media types (e.g., cross point array, QLC, etc.). Rules for migrating the data between the media types can be preset and/or configured by the user.

The memory system 110 can also include additional circuitry or components that are not illustrated. In some implementations, the memory system 110 can include a cache or buffer (e.g., DRAM) and address circuitry (e.g., a row decoder and a column decoder) that can receive an address from the controller 115 and decode the address to access the memory devices 112A to 112N.

Figure 2:
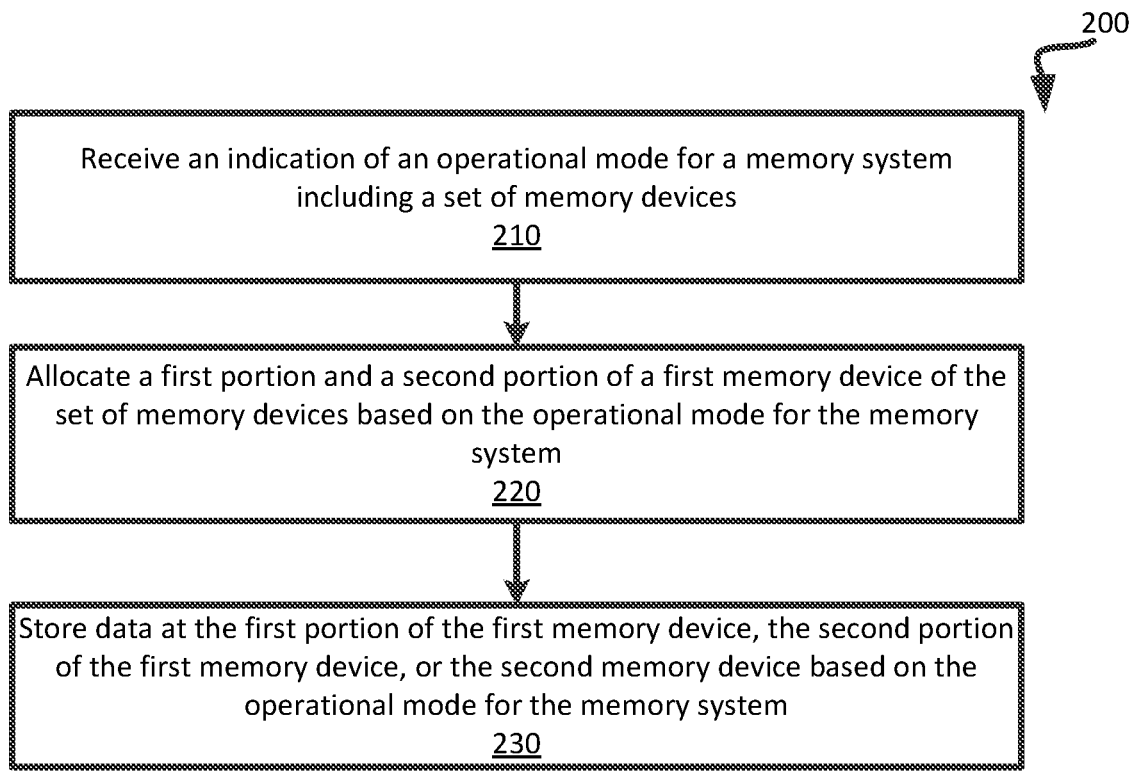
FIG. 2 is a flow diagram of an example method to allocate variable media types in a memory system in accordance with some embodiments.

FIG. 2 is a flow diagram of an example method 200 to allocate variable media types in the memory system 110 in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 can be performed by the managing component 113 of FIG. 1. In some embodiments, the method 200 can be performed by a processing device of the host system 120. For example, an application driver can be provided by the managing component 113 to the host system 120 to perform the operations of method 200.

As shown in FIG. 2, at block 210, processing logic can receive an indication of an operational mode for the memory system 110 that includes the memory devices 112A-112N. A first memory device 112A includes a first media having a first media type (e.g., cross point array), and a second memory device 112N includes a second media having a second media type (e.g., quad-level cell (QLC)) that is different than the first media type. The indication can be that memory system 110 has been connected to the host system 120 and the indication can be a default selection of an operational mode to use for the memory system 110. In some embodiments, the indication can be that the host system 120 is providing data to be written to the memory system 110, or the host system 120 is requesting to store data to the memory system 110 in one of the operational modes. Accordingly, the operational modes can be selected upon setup of the memory system 110 according to preset default configurations or the operational modes can be selected and changed during operation of the memory system 110 in the computing environment 100.

In some embodiments, the first media can occupy a first total percentage (e.g., 25 percent) of the memory system 110 and the portions of the first media can be allocated sub-percentages of the first total percentage, as described further below. For example, the first portion can be allocated any suitable sub-percentage (e.g., 1-25 percent) of the first total percentage and the second portion can be allocated any suitable sub-percentage (e.g., 1-25 percent) of the first total percentage. The sub-percentages can be allocated such that summing the sub-percentages equals the first total percentage (e.g., 25 percent). The second media can occupy a second total percentage (e.g., 75 percent) of the memory system 110, such that summing the first total percentage and the second total percentage equals one hundred percent. In some embodiments, the memory system 110 can include more than two memory devices 112A and 112N and the proportions of the memory system 110 occupied by each memory device can be selected and allocated based on the characteristics (e.g., performance, capacity, etc.) of respective media types and/or the operational modes of the memory system 110.

The operational modes can be stored in the local memory 119 of the controller 115 and/or stored in a memory of the host system 120. In some embodiments, a user interface can be provided to a user on a display of the host system 120 and the user can configure the operational mode in which the memory system 110 is to operate. At any time, the user can modify the operational mode of the memory system 110 as desired to satisfy the goals for using the memory system 100 in the computing environment 100.

At block 220, processing logic can allocate a first portion and a second portion of the first memory device 112A based on the operational mode for the memory system 110. The allocated size of the first portion and the allocated size of the second portion can vary based on the operational mode. In some embodiments, portions of the second memory device 112N can be allocated depending on the operational mode. Accordingly, each of the memory devices 112A-112N can have portions allocated to satisfy the goals (e.g., performance, capacity, etc.) for using the memory system 110 in the computing environment 100. The user can also use the user interface to change the allocations of portions of the first memory device 112A and/or the second memory device 112N for each operational mode.

At block 230, processing logic can store data at the first portion of the first memory device 112A, the second portion of the first memory device 112A, or the second memory device 112N based on the operational mode for the memory system 110. In some embodiments, the operational modes can include a memory expansion mode, a storage mode, a memory mode, and/or a user defined mode. The memory devices 112A-112N and/or portions of the first memory device 112A can be allocated different sizes and/or used for different purposes (e.g., storage type functions or memory type functions) depending on which operational mode is selected. Additionally or alternatively, the sizes allocated to the portion of the first memory device 112A can be the same between some or each of the operational modes.

In the memory expansion mode, storing data can include using the first portion of the first media for a memory type function. The memory type function can refer to the host system 120 using the first portion of the first media in a memory semantic that is memory mapped I/O. The memory type function can include temporarily storing data that is currently being used or that is often used by the host system 120, for example.

Also, in the memory expansion mode, the second portion of the first media can be used as a cache for the second media. The cache can temporarily store data for the second media, thereby improving the performance of requests (reads or writes) for data stored in the second media. In some embodiments, temporary copies of the most active data can be stored in the cache, while a permanent copy of the data can be stored in the second media. Because the first media has a first media type (e.g., cross point array) with faster performance characteristics for reads and writes than the second media type (e.g., QLC) of the second media, the cache for the second media can be provided by the second portion of the first media to enhance performance of accessing certain data of the second media.

Further, in the memory expansion mode, the second media can be used for a storage type function. Storage type functions can refer to storing data longer term (e.g., permanent) than the temporary storage of data that is performed by a memory type function. Thus, storage type functions can take longer to execute than memory type functions. Also, the second media (e.g., QLC) can have certain characteristics (e.g., high capacity) that provide benefits when used for storage type functions.

While used in the memory expansion mode, a size of the first portion and a size of the second portion of the first media that is used as the cache for the second media can be modified by a variable amount. For example, the host system 110 can run a new virtual machine and request the memory system 110 to expand the memory to allow the VM to run using the expanded memory. The first portion of the first media that is used for the memory type function can be expanded by any suitable amount (e.g., tens, hundreds, thousands of megabytes) allowable by the first media. As a result, the second portion of the first media can be reduced by a proportionate amount relative to the increase to the first portion of the first media. In some embodiments, the first portion of the first media can be reduced by any suitable amount if the need for expanded memory no longer exists or for any suitable reason.

In the storage mode, storing data can include using the first portion of the first media for a storage type function. The first portion of the first media can represent a first memory system that benefits from high performance characteristics provided by the first media type (e.g., cross point array). As such, a first namespace (e.g., a group of logical blocks) can be used for accessing data stored at addresses in the first portion of the first media. The second portion of the first media can be used as a cache for the second media, thereby improving the performance of requests for data stored in the second media. Also, in the storage mode, the second media can be used for a storage type function. The second media can represent a second memory system that benefits from high capacity characteristics provided by the second media type (e.g., QLC). As such, a second namespace can be used for accessing data stored at addresses in the second media. Accordingly, the storage mode provides flexibility in deploying a high performance cache memory and storage memory system (e.g., the first media) along with a high capacity memory system (e.g., the second media) within one memory system 110 that occupies one server bay and uses one physical connection to the host system 120.

In the memory mode, storing data can include using the first portion of the first media for a memory type function. The second portion of the first media can be used as a cache for the second media, thereby improving the performance of requests for data stored in the second media. Also, in the memory mode, the second media can be used for a storage type function. The memory system 110 can represent a single memory system when operating in the memory mode and use a single namespace for the second media performing the storage type function. Characteristics of the first media type (e.g., cross point array) for the first media can enable high performance data operations by writing data from the host system 120 to the first media first. Further, characteristics of the second media type (e.g., QLC) for the second media can enable high capacity. Thus, operating the memory system 110 in the memory mode can provide a high capacity, high performant memory system. The data initially written to the first media can be migrated to the second media based on certain criteria for the data (e.g., user defined criteria, access pattern detected by the memory system 110, operational mode selected, etc.), as discussed further below with reference to method 400 of FIG. 4.

In the multi-storage mode, the user can configure how many portions of the memory devices 112A-112N to allocate and the size of those respective portions. Further, the user can configure whether the memory devices 112A-112N and/or the portion(s) of the memory devices 112A-112N are to perform caching, a memory type function, and/or a storage type function. Also, the user can configure under which circumstances the multi-storage mode is to be selected.

In some embodiments, as discussed above, the operational mode for the memory system 110 can change during operation. For example, the user can change the operational mode of the memory system 110 from the memory mode to the storage mode. In other instances, the operational mode can change automatically based on a rule (e.g., certain data is being used, a certain function is being performed by the host system 120, or the host system 120 requests the operational mode change). In some embodiments, switching from one operational mode to another operational mode can correspond to a changing of a size of one or more of the first portion of the first media and a size of the second portion of the first media.

Figure 3A:
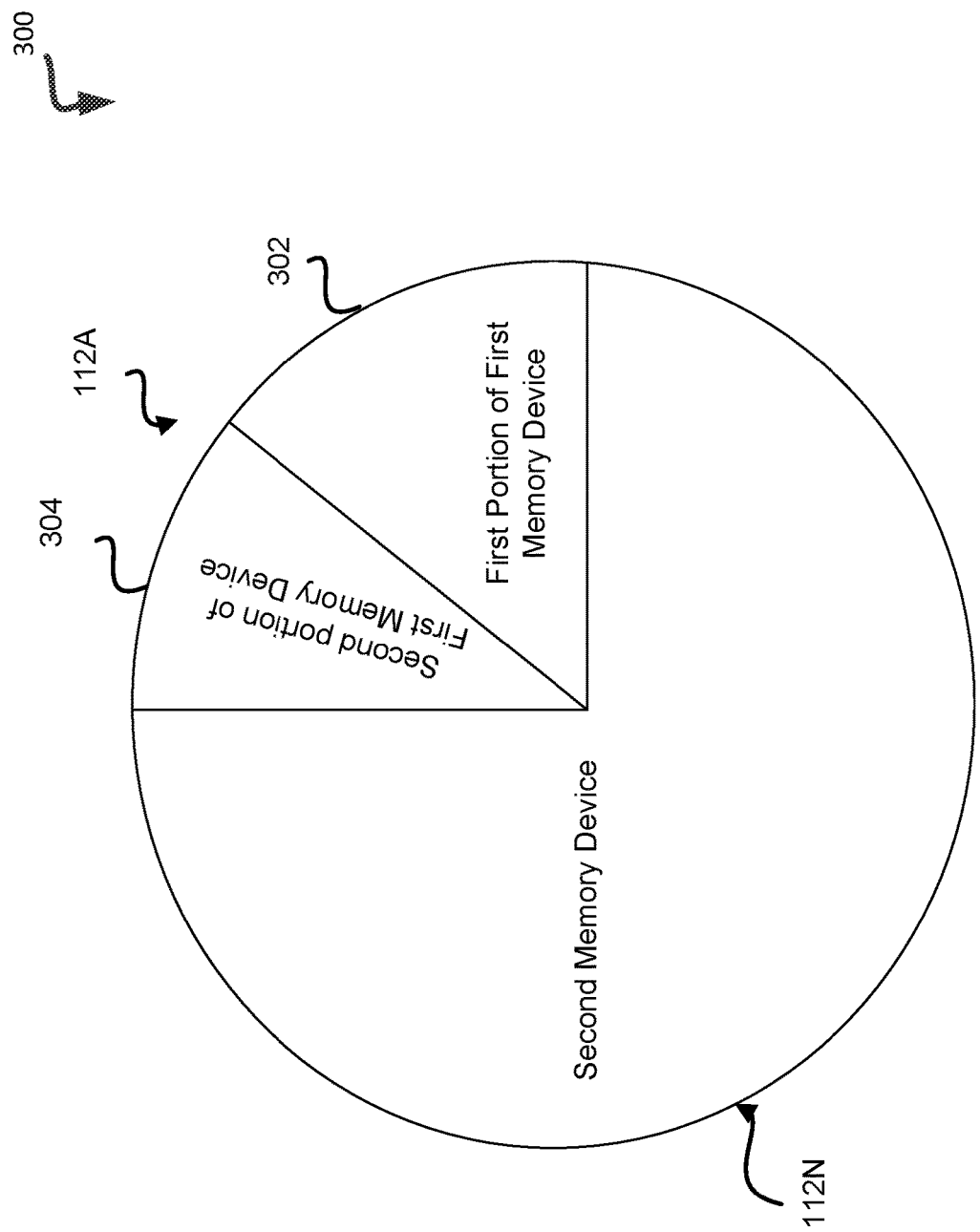
FIG. 3A illustrates an example allocation of a first portion and a second portion of a first memory device for storing data in an operational mode of a memory system in accordance with some embodiments of the present disclosure.
Figure 3B:
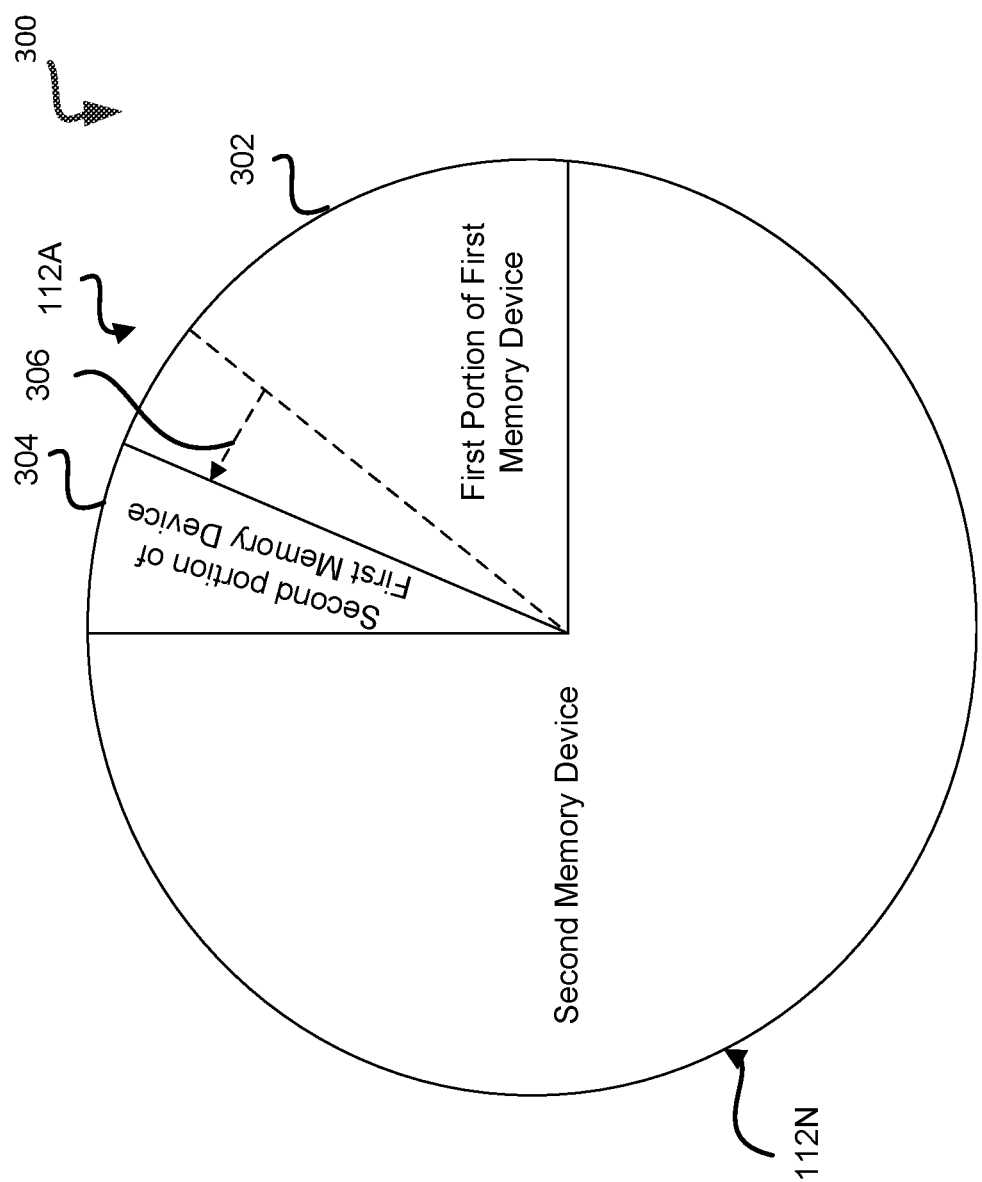
FIG. 3B illustrates another example allocation of a first portion and a second portion of a first memory device for storing data in an operational mode of a memory system in accordance with some embodiments of the present disclosure.

FIG. 3A illustrates an example allocation of a first portion 302 and a second portion 304 of a first memory device 112A for storing data in an operational mode of a memory system 110 in accordance with some embodiments of the present disclosure. FIG. 3B illustrates another example allocation of the first portion 302 and the second portion 304 of the first memory device 112A for storing data in an operational mode of the memory system 110 in accordance with some embodiments of the present disclosure. The allocations shown in FIGS. 3A and 3B can be performed by the managing component 113 of FIG. 1 and/or by the host system 120.

The first memory device 112A and the second memory device 112N are included in the memory system 110. The first memory device 112A includes a first media having a first media type (e.g., cross point array) and the second memory device 112N includes a second media having a second media type (e.g., QLC) that is different than the first media type. As depicted in FIG. 3A, the size of the first portion 302 of the first memory device 112A and the size of the second portion 304 of the first memory device 112A can be a preset default for a particular operational mode selected for the memory system 110, can be configured by the user using a user interface of the host system 120, or the like. The first portion 302 can be used for either a cache, a memory type function, or a storage type function, as set by default for the particular operational mode selected or as configured by the user for the particular operational mode selected. Likewise, the second portion 304 can be used for either a cache, a memory type function, or a storage type function, as set by default for the particular operational mode selected or as configured by the user for the particular operational mode selected.

Although depicted as including just a single portion, the second memory device 112N can also be allocated into portions of variable sizes as desired by the user or based on desired goals for using the second memory device 112N. Also, the second memory device 112N can be used for either a cache, a memory type function, or a storage type function, as set by default for the particular operational mode selected or as configured by the user for the particular operational mode selected.

As shown in FIG. 3B, the size of the first portion 302 can increase or expand (shown by arrow 306) and the size of the second portion 304 can decrease or shrink relative to the increased size of the first portion 302. In some embodiments, the size of the first portion 302 and the second portion 304 can change based on a switch in operational modes (e.g., memory expansion mode, memory mode, storage mode, multi-storage mode, etc.). For example, the memory system 110 can be storing data in a first operational mode where the first portion 302 and the second portion 304 are allocated based on sizes for the first operational mode and the memory system 110 can receive an indication to switch to storing data in a second operational mode. The second operational mode can specify allocating a larger size for the first portion 302 of the memory device 112A than in the first operational mode, thereby causing the size of the first portion 302 to increase (show by arrow 306) and the size of the second portion 304 to decrease for the second operational mode.

In some embodiments, the size of portions 302 and 304 can change during the memory expansion mode. For example, the host system 120 can request that the memory be expanded in the memory system 110 to accommodate running a new application, processing data, or the like. Thus, the size of the first portion 302 can be increased (show by arrow 306) and the size of the second portion 304 can be decreased during the memory expansion mode. In addition, the size of the portions 302 and 304 can be changed by any variable (e.g., in non-fixed increments) amount at any suitable time by a user using a user interface presented via the host system 120.

Figure 4:
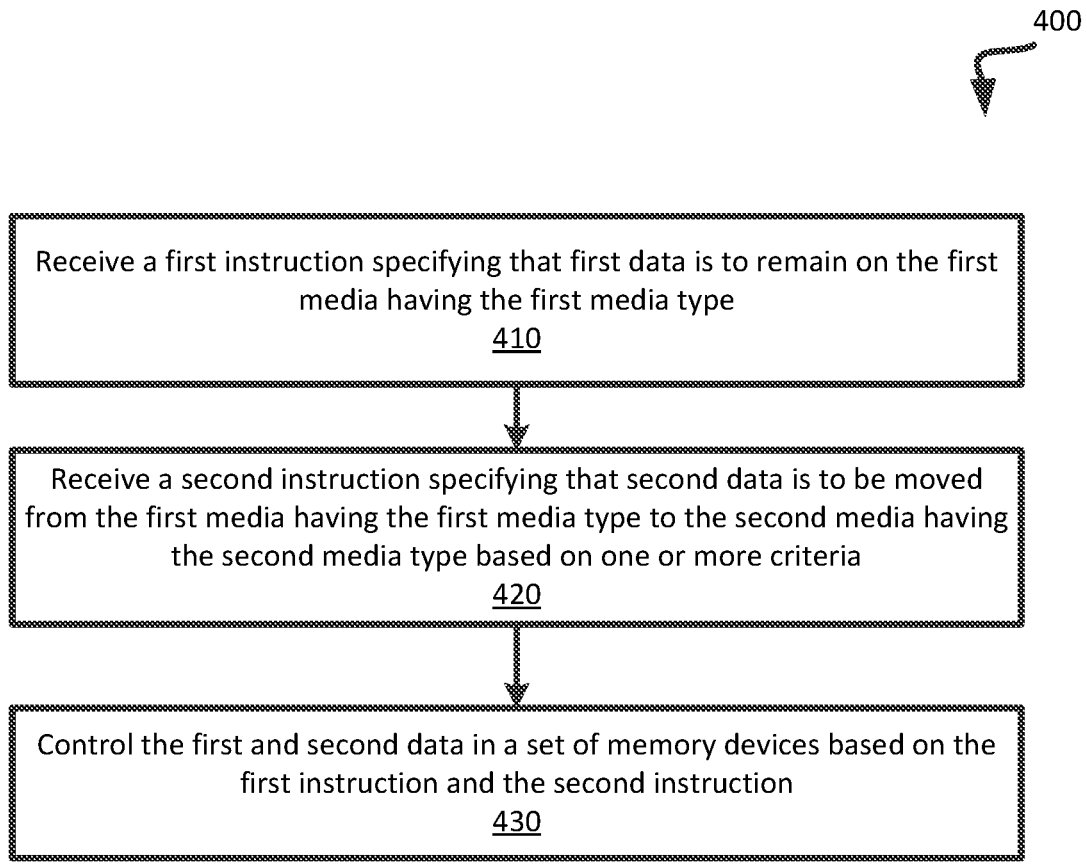
FIG. 4 is a flow diagram of an example method to specify the data that is to remain on or be moved from a first media having a first media type in accordance with some embodiments.

FIG. 4 is a flow diagram of an example method 400 to specify the data that is to remain on or be moved from a first media having a first media type in accordance with some embodiments. The first media can be included as part of the first memory device 112A. A second memory device 112N can include a second media having a second media type that is different than the first media type.

The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 can be performed by the managing component 113 of FIG. 1. In some embodiments, the method 400 can be performed by the host system 120. For example, an application driver can be provided by the managing component 113 to the host system 120 to perform the operations of method 400.

As shown in FIG. 4, at block 410, the processing logic can receive a first instruction specifying that first data is to remain on the first media having the first media type. In some embodiments, the first media type (e.g., cross point array) of the first memory device 112A can provide high performance characteristics for reading and writing data. Accordingly, the user can specify that the first data that is frequently accessed, currently in use by the host system 120, written recently, relevant to frequently used applications on the host system 120, has a certain data type or size, or the like, can remain on the first media indefinitely or for a set period of time.

At block 420, the processing logic can receive a second instruction specifying that second data is to be moved from the first media having the first media type to the second media having the second media type based on one or more criteria. The one or more criteria can be user defined or default rules, a data access pattern detected by the memory system 110, or the operational mode in which the memory system 110 is storing data.

User defined criteria or default rules can include a type of data to move from the first media to the second media, a period of time to maintain the second data on the first media before moving the second data to the second media, how much data is currently in the first media or the second media, the amount of time that has elapsed since the second data was last accessed, a frequency of how often the second data is accessed, and so forth. In addition, the processor 117 of the memory system 110 or a processing device of the host system 120 can monitor access to the second data to determine a data access pattern for the second data. If the second data is accessed less than a threshold number of times or for less than a threshold amount of time, the second data can be moved to the second media for longer term storage. Also, the second data can be moved to the second media based on the operational mode selected for the memory system 110. For example, the memory mode can specify that data that is not accessed frequently on the first media can be moved to the second media after a threshold period of time.

At block 430, the processing logic can control the first and second data in the first and second memory devices based on the first instruction and the second instruction. In some embodiments, the processing logic can present a user interface to present one or more options related to data management on the memory system 110. The host system 120 can present the user interface via a display. The user can interact with the options, which can cause the first instruction and the second instruction to be sent to the memory system 110. The options can enable the user to set the criteria for keeping data on the first media and for moving data to the second media.

Figure 5:
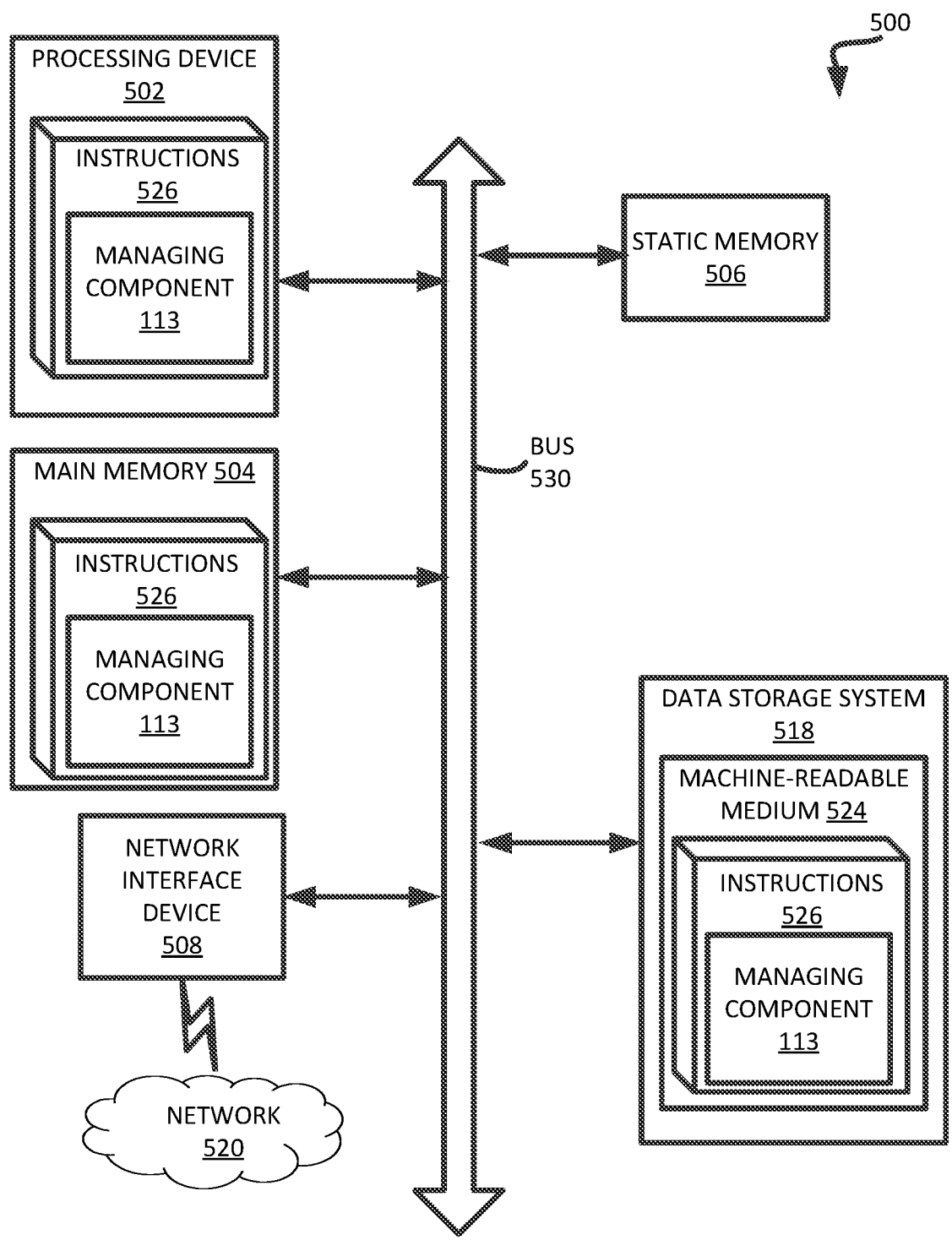
FIG. 5 is a block diagram of an example computer system in which implementations of the present disclosure may operate.

FIG. 5 illustrates an example machine of a computer system 500 within which a set of instructions, for causing the machine to perform any one or more of the methodologies discussed herein, can be executed. In some implementations, the computer system 500 can correspond to a host system (e.g., the host system 120 of FIG. 1) that includes or utilizes a memory system (e.g., the memory system 110 of FIG. 1) or can be used to perform the operations of a controller (e.g., to execute an operating system to perform operations corresponding to the managing component 113 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions or software 526 embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory system 110 of FIG. 1.

In one implementation, the instructions 526 include instructions to implement functionality corresponding to a managing component (e.g., the managing component 113 of FIG. 1). While the machine-readable storage medium 524 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving an indication of a first operational mode for a memory system comprising a plurality of memory devices, wherein a first memory device of the plurality of memory devices includes a first media having a first media type and a second memory device of the plurality of memory devices includes a second media having a second media type that is different than the first media type;
   allocating, by a processing device, a first portion and a second portion of the first memory device based on the first operational mode for the memory system, wherein the first portion and the second portion of the first memory device are used for different functions;
   storing data at the first portion of the first memory device, the second portion of the first memory device, or the second memory device based on the first operational mode for the memory system;
   receiving an indication of a switch from the first operational mode to a second operational mode for the memory system; and
   modifying at least one of a size or a function of at least one of the first portion or the second portion on the first memory device based on a preset default configuration for the second operational mode.

2. The method of claim 1, wherein a size of the first portion and a size of the second portion are associated with the first operational mode.

3. The method of claim 1, wherein the first operational mode corresponds to a memory expansion mode, wherein storing the data comprises:
   using the first portion of the first media for a memory type function;
   using the second portion of the first media as a cache for the second media; and
   using the second media for a storage type function, wherein a size of the first portion and a size of the second portion of the first media are modified by a variable amount.

4. The method of claim 1, wherein the first operational mode corresponds to a storage mode, wherein storing the data comprises:
   using the first portion of the first media for a storage type function;
   using the second portion of the first media as a cache for the second media;
   using the second media for a storage type function; and
   using a first namespace for the first portion of the first media and a second namespace for the second media.

5. The method of claim 1, wherein the first operational mode corresponds to a memory mode, wherein storing the data comprises:
   using the first portion of the first media for a memory type function;
   using the second portion of the first media as a cache for the second media;
   using the second media for a storage type function;
   writing the data to the first media; and
   determining to move the data from the first media to the second media based on a criteria for the data.

6. The method of claim 5, further comprising using a namespace for the second media being used for the storage type function.

7. The method of claim 1, further comprising:
   determining when to move data from the first media to the second media based on at least one or more of a user defined criteria, a data access pattern, or the first operational mode currently operating on the memory system.

8. The method of claim 1, wherein the first media type is non-flash based and the second media type is Quad Level Cell (QLC).

9. A non-transitory computer-readable storage medium comprising instructions that, when executed by a processing device, cause the processing device to:

receive an indication of a first operational mode for a memory system comprising a plurality of memory devices, wherein a first memory device of the plurality of memory devices includes a first media having a first media type and a second memory device includes a second media having a second media type that is different than the first media type;

allocate a first portion and a second portion of the first memory device based on the first operational mode for the memory system, wherein the first portion and the second portion of the first memory device are used for different functions;

store data at the first portion of the first memory device, the second portion of the first memory device, or the second memory device based on the first operational mode for the memory system;

receive an indication of a switch from the first operational mode to a second operational mode for the memory system; and modify at least one of a size or a function of at least one of the first portion or the second portion on the first memory device based on a preset default configuration for the second operational mode.

10. The computer-readable storage medium of claim 9, wherein a size of the first portion and a size of the second portion are associated with the first operational mode.

11. The computer-readable storage medium of claim 9, wherein the first operational mode corresponds to a memory expansion mode, wherein to store the data the processing device is further to:
use the first portion of the first media for a memory type function;
use the second portion of the first media as a cache for the second media; and
use the second media for a storage type function, wherein a size of the first portion and a size of the second portion of the first media are modified by a variable amount.

12. The computer-readable storage medium of claim 9, wherein the first operational mode corresponds to a storage mode, wherein to store the data the processing device is further to:
use the first portion of the first media for a storage type function;
use the second portion of the first media as a cache for the second media;
use the second media for a storage type function; and
use a first namespace for the first portion of the first media and a second namespace for the second media.

13. The computer-readable storage medium of claim 9, wherein the first operational mode corresponds to a memory mode, wherein to store the data the processing device is further to:
use the first portion of the first media for a memory type function;
use the second portion of the first media as a cache for the second media;
use the second media for a storage type function;
write the data to the first media; and
determine to move the data from the first media to the second media based on a criteria for the data.

14. The computer-readable storage medium of claim 13, wherein the processing device is further to use a namespace for the second media being used for the storage type function.

15. The computer-readable storage medium of claim 9, wherein the processing device is further to:
determine when to move data from the first media to the second media based on at least one or more of a user defined criteria, a data access pattern, or the first operational mode currently operating on the memory system.

16. A system comprising:
a plurality of memory devices, wherein a first memory device of the plurality of memory devices includes a first media having a first media type and a second memory device of the plurality of memory devices includes a second media having a second media type that is different than the first media type; and
a processing device, operatively coupled with the plurality of memory devices, to perform operations comprising:
receiving an indication of a first operational mode for a memory system comprising a plurality of memory devices, wherein a first memory device of the plurality of memory devices includes a first media having a first media type and a second memory device of the plurality of memory devices includes a second media having a second media type that is different than the first media type;
allocating, by a processing device, a first portion and a second portion of the first memory device based on the first operational mode for the memory system, wherein the first portion and the second portion of the first memory device are used for different functions;
storing data at the first portion of the first memory device, the second portion of the first memory device, or the second memory device based on the first operational mode for the memory system;
receiving an indication of a switch from the first operational mode to a second operational mode for the memory system; and
modifying at least one of a size or a function of at least one of the first portion or the second portion on the first memory device based on a preset default configuration for the second operational mode.

17. The system of claim 16, wherein a size of the first portion and a size of the second portion are associated with the first operational mode.

18. The system of claim 16, wherein the processing device to perform further operations comprising:
determining when to move data from the first media to the second media based on at least one or more of a user defined criteria, a data access pattern, or the first operational mode currently operating on the memory system.

* * * * *

UNITED STATES PATENT AND TRADEMARK OFFICE
CERTIFICATE OF CORRECTION

PATENT NO. : 10,929,033 B2
APPLICATION NO. : 15/963007
DATED : February 23, 2021
INVENTOR(S) : James H. Meeker, Michael B. Danielson and Paul A. Suhler It is certified that error appears in the above-identified patent and that said Letters Patent is hereby corrected as shown below:

On the Title Page

Item (57) Abstract, delete the sentence:
"A first memory device of the set of memory devices includes a first media having a first media type and a second memory device of the et of memory devices includes a second media having a second media type that is different than the first media type."

And insert sentence:
--A first memory device of the set of memory devices includes a first media having a first media type and a second memory device of the set of memory devices includes a second media having a second media type that is different than the first media type.--

Signed and Sealed this
Fourth Day of May, 2021

Drew Hirshfeld
*Performing the Functions and Duties of the
Under Secretary of Commerce for Intellectual Property and
Director of the United States Patent and Trademark Office*